(12) United States Patent
Aftelak et al.

(10) Patent No.: US 8,200,183 B2
(45) Date of Patent: Jun. 12, 2012

(54) DETERMINING WIRELESS SYSTEM AVAILABILITY USING EMERGENCY ALERT SYSTEM MESSAGING

(75) Inventors: Andrew Aftelak, Palatine, IL (US); Li-Xin Zhen, Shanghai (CN)

(73) Assignee: Motorola Solutions, Inc., Schaumburg, IL (US)

( * ) Notice: Subject to any disclaimer, the term of this patent is extended or adjusted under 35 U.S.C. 154(b) by 918 days.

(21) Appl. No.: 12/042,563

(22) Filed: Mar. 5, 2008

(65) Prior Publication Data
US 2009/0227224 A1 Sep. 10, 2009

(51) Int. Cl.
H04M 11/04 (2006.01)
H04W 24/00 (2009.01)
H04W 72/00 (2009.01)
H04B 7/04 (2006.01)

(52) U.S. Cl. .................. 455/404.1; 455/404.2; 455/423; 455/450; 455/456.1; 455/521

(58) Field of Classification Search .... 455/404.1–404.2, 455/414.3, 115.1–115.3, 226.1–226.4, 423–425, 455/67.11, 421, 452.2, 456.1–456.3, 457, 455/515, 516, 452.1; 370/241.1, 242–251, 370/328, 432
See application file for complete search history.

(56) References Cited

U.S. PATENT DOCUMENTS

| | | | |
|---|---|---|---|
| 6,745,021 B1 | 6/2004 | Stevens | |
| 6,847,892 B2 | 1/2005 | Zhou et al. | |
| 7,054,612 B2 | 5/2006 | Patel | |
| 7,061,877 B1 * | 6/2006 | Gummalla et al. | 370/278 |
| 7,174,150 B2 * | 2/2007 | Shida | 455/404.1 |
| 7,681,215 B2 * | 3/2010 | Kim | 455/404.1 |
| 2003/0069002 A1 | 4/2003 | Hunter et al. | |
| 2003/0137415 A1 | 7/2003 | Thomson | |
| 2004/0259568 A1 * | 12/2004 | Patel | 455/456.1 |
| 2005/0085257 A1 * | 4/2005 | Laird et al. | 455/550.1 |

(Continued)

FOREIGN PATENT DOCUMENTS
KR 10-2007-0077695 A 7/2007

OTHER PUBLICATIONS
U.S. Appl. No. 11/966,143, filed Dec. 28, 2007, Kane et al.

(Continued)

*Primary Examiner* — Rafael Pérez-Gutiérrez
*Assistant Examiner* — Thai Vu
(74) *Attorney, Agent, or Firm* — H. David Watanabee; Randi L. Karpinia; Kenneth A. Haas (57) ABSTRACT

A method and information processing system transmit emergency alert system messages to wireless devices. An EAS alert message (302) is transmitted to at least one wireless device (106) using one or more access channels (306) associated with a coverage area. An acknowledgement message (200) is received from the wireless device (106). The acknowledgement message (200) includes at least one of a location associated with the wireless device (106) and an identifier associated with each access channel over which the wireless device (106) received the EAS alert message (302). At least one of a first set of information indicating locations within the coverage area that have successfully received the EAS alert message (302) and a second set of information indicating which access channels have successfully transmitted the EAS alert message (302) to the wireless devices (106) within the coverage area are stored based on receiving the acknowledgement message.

10 Claims, 8 Drawing Sheets

U.S. PATENT DOCUMENTS

| | | | |
|---|---|---|---|
| 2005/0201309 A1* | 9/2005 | Kang et al. | 370/310 |
| 2006/0009191 A1 | 1/2006 | Malone, III | |
| 2006/0014548 A1 | 1/2006 | Bolin et al. | |
| 2006/0052090 A1 | 3/2006 | Behr et al. | |
| 2006/0058948 A1 | 3/2006 | Blass et al. | |
| 2006/0071783 A1 | 4/2006 | Culpepper et al. | |
| 2006/0126556 A1* | 6/2006 | Jiang et al. | 370/432 |
| 2006/0158328 A1 | 7/2006 | Culpepper et al. | |
| 2006/0227215 A1* | 10/2006 | Yamauchi | 348/193 |
| 2008/0031163 A1* | 2/2008 | Javitt et al. | 370/277 |

OTHER PUBLICATIONS

U.S. Appl. No. 11/966,536, filed Dec. 28, 2007, Nowlan et al.
U.S. Appl. No. 11/965,109, filed Dec. 27, 2007, Kane.
PCT/US2009/035754 Search Report; Aug. 3, 2009; 10 Pages.

* cited by examiner

| WIRELESS DEVICE ID | COVERAGE AREA | LOCATION | WIRELESS ACCESS CHANNEL | ... |
|---|---|---|---|---|
| WD_A | 1 | LOC_1.1 | Wi-Fi | ... |
| WD_B | 1 | LOC_1.1 | Wi-Fi | ... |
| WD_J | 1 | LOC_1.3 | Wi-Fi | ... |
| WD_L | 2 | LOC_2.4 | CELLULAR | ... |
| WD_M | 2 | LOC_2.4 | CELLULAR | ... |
| ... | | | | ... |
| ... | | | | ... |
| ... | | | | ... |
| WD_Z | N | LOC_N.N | BROADCAST, CELLULAR, Wi-Fi | ... |

DETERMINING WIRELESS SYSTEM AVAILABILITY USING EMERGENCY ALERT SYSTEM MESSAGING

FIELD OF THE INVENTION

The present invention generally relates to the field of emergency alert system transmissions and wireless communication systems, and more particularly relates to determining wireless system availability using emergency alert system messages.

BACKGROUND OF THE INVENTION

Emergency alert systems (EAS) are used to communicate vital information to the public during emergency situations. This information is generally conveyed to the public via televisions or public addressing systems. The EAS in the United States is composed of analog radio broadcast stations including AM, FM, and Low-power FM (LPFM) stations; digital audio broadcasting (DAB) stations, including digital AM, FM, and Low-power FM stations; analog television broadcast stations including Class A television (CA) and Low-power TV (LPTV) stations; digital television (DTV) broadcast stations, including digital CA and digital LPTV stations; analog cable systems; digital cable systems which are the portion of a cable system that delivers channels in digital format to subscribers at the input of a Unidirectional Digital Cable Product or other navigation device; wireline video systems; wireless cable systems which may consist of Broadband Radio Service (BRS), or Educational Broadband Service (EBS) stations; DBS services, including certain Ku-band Fixed-Satellite Service Direct to Home providers; SDARS; participating broadcast networks, cable networks and program suppliers; and other entities and industries operating on an organized basis during emergencies at the National, State and local levels. These entities are referred to collectively as the Emergency Alert System (the EAS). At a minimum, the participants making up the EAS must use a common EAS protocol to send and receive emergency alerts.

The common EAS protocol includes plans to use the EAS header codes and messages that will be transmitted by key EAS sources (NP, LP, SP, and SR). State and local plans contain unique methods of EAS message distribution such as the use of the Radio Broadcast Data System (RBDS). The EAS uses a four part message for an emergency activation of the EAS. The four parts are: Preamble and EAS Header Codes; audio Attention Signal; message; and, Preamble and EAS End Of Message (EOM) Codes. The message may be audio, video, or text. Characters are ASCII seven bit characters as defined in ANSI X3.4-1977 ending with an eighth null bit (either 0 or 1) to constitute a full eight-bit byte.

Enhancements to the Emergency Alert System have been proposed. Specifically, the Commercial Mobile Service Alert Initiative has been created to allow wireless cellular carriers to transmit emergency alert messages to cell phones and other devices having text message capabilities; see (www.fcc.gov/pshs/cmsaac/docs/pdf/Charter.pdf). Yet these proposals fail to provide an accurate method of determining whether intended recipients of an EAS alert have successfully received the alert.

As can be appreciated from the discussion above, conventional emergency alert systems may generally have sent notification messages to recipients over a relatively wide geographic area to alert the recipients of an emergency situation, but generally do not provide feedback to the system transmitting the alerts that indicates a successful reception of the alerts by a wireless device.

Therefore a need exists to overcome the problems with the prior art as discussed above.

SUMMARY OF THE INVENTION

Briefly, in accordance with one embodiment of the present invention, disclosed is a method for transmitting emergency alert system messages to wireless devices. The method includes receiving an emergency alert system (EAS) alert message for delivery to one or more wireless devices in a coverage area of a wireless communication system. The EAS alert message is transmitted to the one or more wireless devices using a plurality of access channels associated with the coverage area. An acknowledgement message is received from at least one of the one or more wireless devices. The acknowledgement message includes at least one of a location associated with the wireless device and an identifier associated with each access channel in the plurality access channels over which the wireless device received the EAS alert message. At least one of a first set of information indicating locations within the coverage area that have successfully received the EAS alert message and a second set of information indicating which access channels in the plurality of access channels have successfully transmitted the EAS alert message to a wireless device within the coverage area are stored based on receiving the acknowledgement message.

In another embodiment a method for receiving emergency alert system messages is disclosed. The method includes receiving at least one EAS alert message from a wireless communication system over at least one wireless access method. A current location and the at least wireless access method through which the EAS alert message was received are determined in response to receiving the emergency alert system messages. A message is transmitted to the wireless communication system comprising at least one of an identifier associated with the current location that has been determined and an identifier for each of the at least one wireless access method through which the EAS alert message was received.

In yet another embodiment, an information processing system for transmitting emergency alert system messages to wireless devices is disclosed. The information processing system includes a memory and a processor that is communicatively coupled to the memory. The information processing system also includes an emergency message controller that is communicatively coupled to the memory and the processor. The emergency message controller is adapted to receive an emergency alert system (EAS) alert message for delivery to one or more wireless devices in a coverage area of a wireless communication system. The EAS alert message is transmitted to the one or more wireless devices using a plurality of access channels associated with the coverage area. An acknowledgement message is received from at least one of the one or more wireless devices. The acknowledgement message includes at least one of a location associated with the wireless device and an identifier associated with each access channel in the plurality access channels over which the wireless device received the EAS alert message. At least one of a first set of information indicating locations within the coverage area that have successfully received the EAS alert message and a second set of information indicating which access channels in the plurality of access channels have successfully transmitted the EAS alert message to a wireless device within the coverage area are stored based on receiving the acknowledgement message.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

The term "wireless device" is intended to broadly cover many different types of devices that can wirelessly receive signals, and in most cases can wirelessly transmit signals, and may also operate in a wireless communication system. For example, and not for any limitation, a wireless device can include any one or a combination of the following: a two-way radio, a cellular telephone, a mobile phone, a smartphone, a two-way pager, a wireless messaging device, a laptop/computer, automotive gateway, residential gateway, and any type of wireless communication device.

Figure 1:
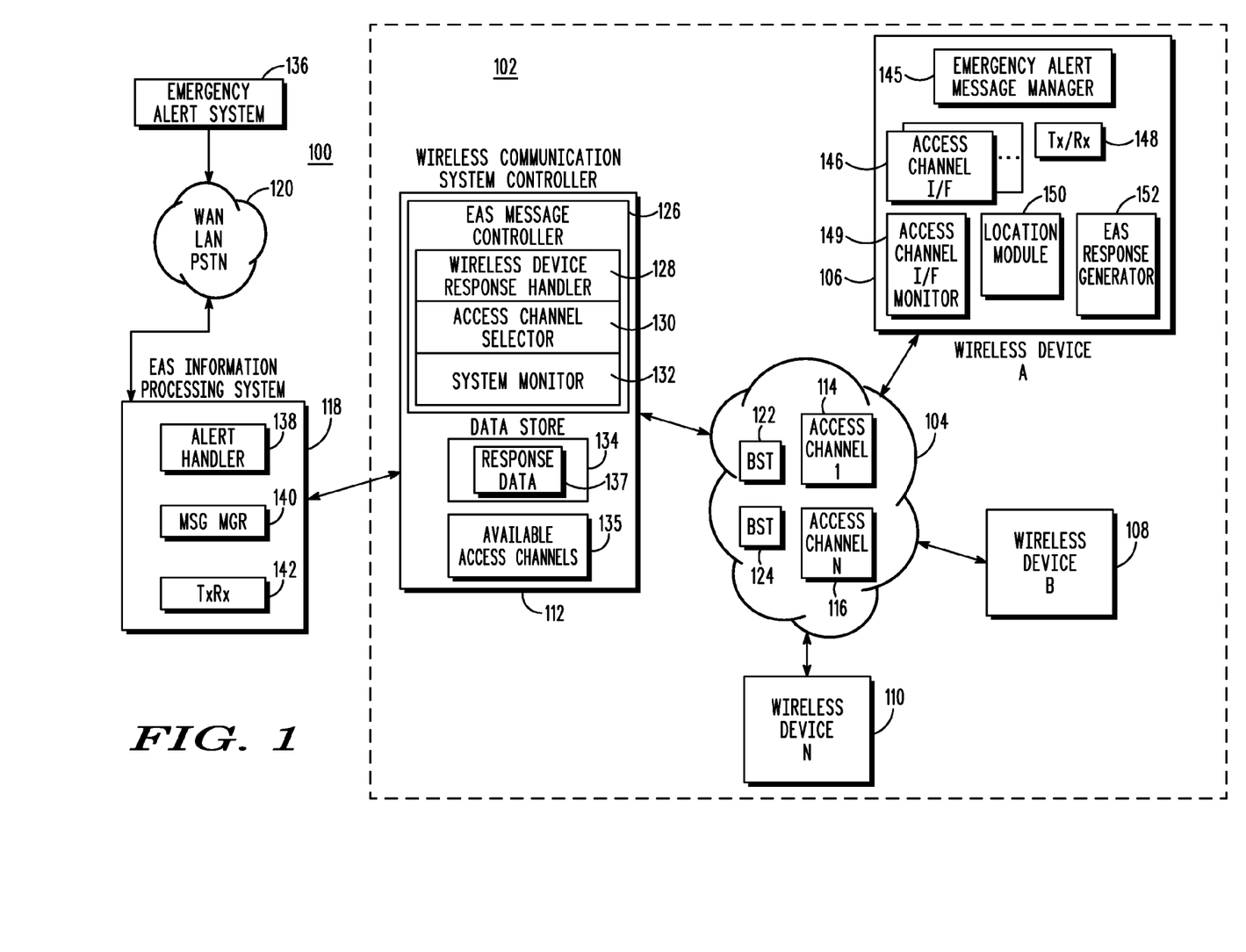
FIG. 1 is a block diagram illustrating an example of a wireless communication system and an emergency alert system, according to one embodiment of the present invention.

According to one embodiment of the present invention as shown in FIG. 1 a general operating environment 100 for implementing one or more embodiments of the present invention is illustrated. In particular, FIG. 1 shows one example of a wireless communication system 102 comprising a network 104 that communicatively couples one or more wireless devices 106, 108, 110 to a wireless communication system controller 112. Throughout the following discussion, the communication standard of the wireless communication system 102 and the network 104 may be referred to as Code Division Multiple Access (CDMA). However, the present invention is not limited to CDMA. For example, other communication standards such as Time Division Multiple Access (TDMA), Global System for Mobile Communications (GSM), General Packet Radio Service (GPRS), Integrated Dispatch-Enhanced Network (iDEN), Frequency Division Multiple Access (FDMA), other IEEE 802.16 standards, Orthogonal Frequency Division Multiplexing (OFDM), Orthogonal Frequency Division Multiple Access (OFDMA), LTE, UMB, Wireless LAN (WLAN), WiMax or the like are also applicable to the present invention. Other applicable communications standards include those used for Public Safety Communication Networks including Project 25 (P25) or TErrestrial TRunked rAdio (TETRA).

In one embodiment, the network 104 comprises one or more access networks such as a packet data network and/or a circuit services network that provide one or more wired/wireless access channels 114, 116 to the wireless devices 106, 108, 110. In one embodiment, the packet data network is an IP based connectivity network, which provides data connections at much higher transfer rates than a traditional circuit services network. A packet data network can comprise an Evolution Data Only ("EV-DO") network, a General Packet Radio Service ("GPRS") network, a Universal Mobile Telecommunications System ("UMTS") network, an 802.11 network, an 802.16 (WiMax) network, Ethernet connectivity, dial-up modem connectivity, or the like. A circuit services network provides, among other things, voice services to the wireless devices 106, 108, 110 communicatively coupled to the network 104.

Figure 3:
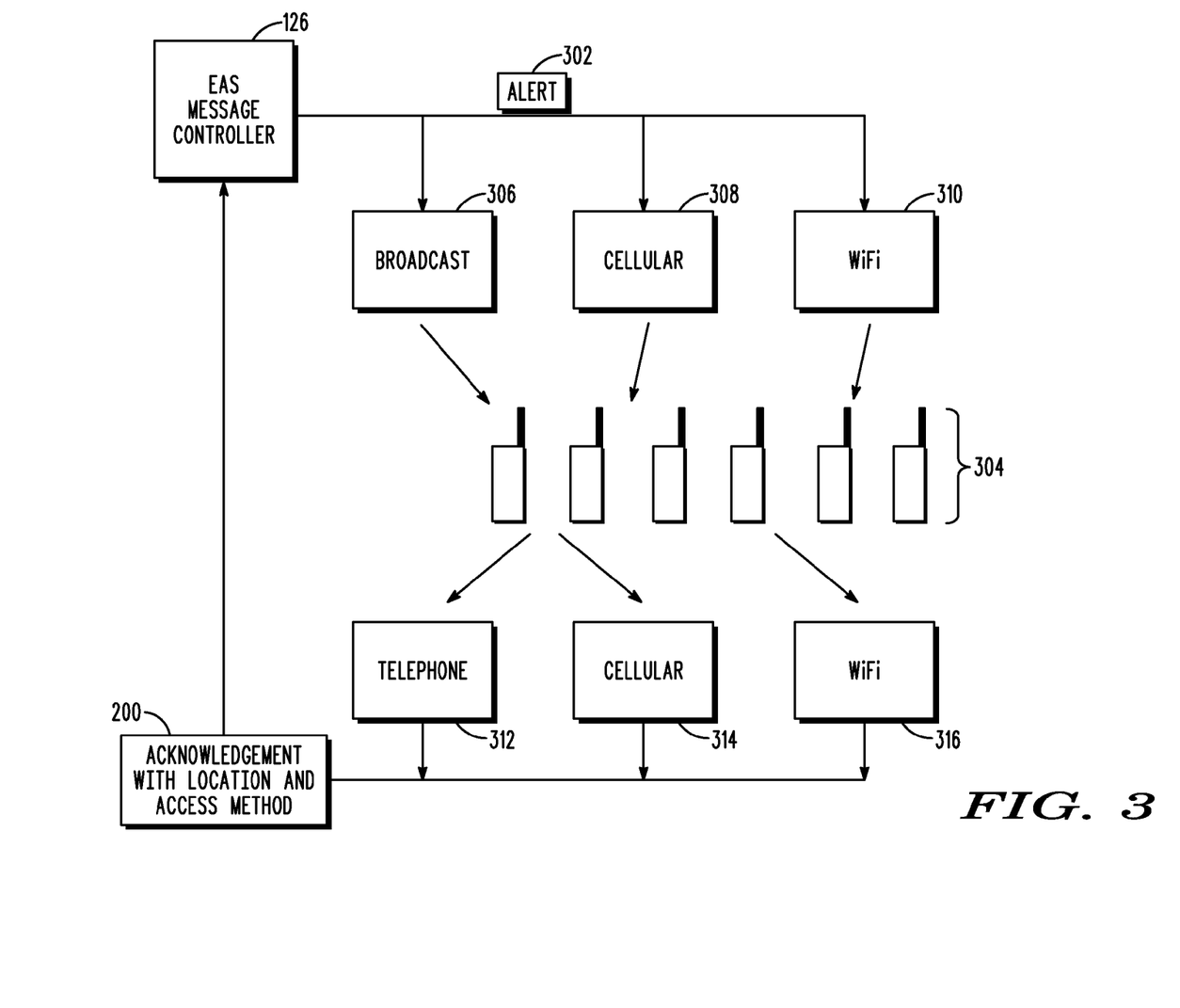
FIG. 3 is a block diagram illustrating a general overview of a system for generating an emergency alert message to a wireless device over multiple access channels and receiving a response back from the wireless device, according to one embodiment of the present invention.

The wireless/wired services provided by the packet data networks and circuit services networks are collectively referred from here on in as "access channels" 114, 116. For example, FIG. 3 shows a few examples of the access channels 114, 116 provided by a packet data channel and a circuit services channel. In particular FIG. 3 shows wireless access methods such as broadcast, cellular, WiFi, and PSTN. These are only a few of the wireless access methods that are applicable to the various embodiments of the present invention. It should be noted that access networks can also include additional network components (not necessarily shown in FIG. 1) such as controllers, transport/interconnect gear, network management modules, and the like, that should be generally known to those of ordinary skill in the art.

The network 104, in this example, also includes multiple Base Transceiver Stations ("BTSs" or "base stations") 122, 124, communicatively coupled to the central wireless communication system controller 112. Each base station 122, 124 includes at least one transceiver (Tx/Rx) which can wirelessly communicate (wirelessly transmit and receive signals) with one or more wireless devices 106, 108, 110, located in particular coverage areas covered by each base station 122, 124. Each base station 112, 114, 116, includes a processor, such as one or more microprocessors, microcontrollers, digital signal processors ("DSPs"), or combinations thereof.

The central wireless communication system controller 112 includes a one or more processors and associated memory devices that store data and programs that may be executed by the one or more processors. The central wireless communication system controller 112, in one embodiment, includes an EAS message controller 126 for transmitting an EAS alert message to the wireless devices 106, 108, 110 and also for managing responses to such messages received back from the wireless devices 106, 108, 110. The EAS message controller 126 includes a wireless device response handler 128, an access channel selector 130, and a system monitor 132. The central wireless communication system controller 112 also includes a data store 134 for storing data 137 associated with EAS alert responses received from the wireless devices 106, 108, 110. Each of these components of the central wireless communication system controller 112 is discussed in greater detail below.

It should be noted that the EAS message controller 126 can reside outside of the central wireless communication system controller 112. For example, the central wireless communication system controller 112 can reside at an information processing system such as the EAS information processing system 118 (discussed below) that is communicatively coupled to the central wireless communication system controller 112 or to each of the base stations 122, 124. It should also be noted that the data store 124 is not required to reside within the central wireless communication system controller 112.

An information processing system 118, in this example, is designated as an interface system between the wireless communication system 102 and an Emergency Alert System (EAS) 136. The information processing system 118 may also be referred to as an EAS information processing system 118. The Emergency Alert System 136 generates emergency alerts and messages typically issued by a national, state, or local government. The EAS information processing system 118, according to one embodiment shown in FIG. 1, includes an emergency alert handler 138, an emergency message manager 140, and a transceiver 142. Each of these components is discussed in greater detail below. All of these components may not be found in every embodiment of the invention. Also, one or more of these components can be implemented as a functional component using a combination of hardware, software, or both. The transceiver 144, for example, may be optional in certain EAS system configurations. As an example, and not for limitation, the EAS system 118 in various embodiments may be part of a wireless carrier's core network and the transceiver 142 functions could be at least in part incorporated into the wireless carrier's core network.

The EAS information processing system 118 communicatively couples to the Emergency Alert System 136 via one or more external networks, such as a Wide Area Network (WAN), a Local Area Network (LAN), and a Public Switched Telephone Network (PSTN). These various types of external networks are collectively indicated in FIG. 1 by the single cloud symbol 120. It should be understood that many different types of networks and network links, and combinations thereof, may be represented by the network cloud 120. For example, and not for limitation, the Internet, a private local area network, one or more broadcast channels, one or more cable networks, one or more telephone networks, one or more wireless and/or wired network links, and one or more satellite communication networks, or a combination thereof, may be included in various embodiments of the present invention.

The EAS information processing system 118 communicatively couples emergency alert messages to the central wireless communication system controller 113 which can communicate messages to the wireless devices 106, 108, 110, via wireless transmissions by the base stations 122, 124 using one or more of wireless access method. The wirelessly transmitted messages, which can comprise the emergency alert messages, are typically destined for reception by the one or more wireless devices 106, 108, 110, within a coverage area. Wireless devices 106, 108, 110, are typically selected to receive a transmitted message by including with the transmitted message certain destination identifying information, such as an address that the destination wireless device 106, 108, 110, will be receptive to receive the wirelessly transmitted message. A message is therefore destined for reception by a destination wireless device 106, 108, 110, when the message includes the certain destination identifying information that selects a particular wireless device 106, 108, 110, or a particular group of wireless devices 106, 108, 110, to receive the transmitted message.

The EAS information processing system 118 receives the alerts from the Emergency Alert System 136, in one embodiment, via one or more particular communication channel(s), indicated by the network cloud 120, and sends corresponding emergency alert messages to the wireless devices 106, 108, 110, in the wireless communication system 102. It should be noted that the EAS information processing system 118 can also be communicatively coupled to a local emergency alerting system, such as a fire alarm system, a biological pollutant alerting system, or other type of local alerting system, and can send alert messages from such local emergency alerting system to the wireless devices 106, 108, 110, in the wireless communication system 102.

The wireless communication system 102 supports any number of wireless devices 106, 108, 110, which can be single mode or multi-mode devices. Multi-mode devices are capable of communicating over multiple access networks with varying technologies. For example, a multi-mode wireless device can communicate over various access networks such as GSM, UMTS, CDMA, or WiFi. In addition, multiple communication protocols such as Push-To-Talk (PTT), Push-To-Talk Over Cellular (PoC), voice traffic channel, multimedia messaging, web browsing, Voice over IP (VoIP), and multimedia streaming may be utilized.

Each wireless device 106, 108, 110, according to one embodiment, includes an emergency alert message manager 145, one or more access channel interfaces 146 communicatively coupled to a transceiver 148, an access channel interface monitor 149, a location module 150, and an EAS response generator 152. Each of these components is discussed in greater detail below.

During times of an emergency, such as a fire, hurricane, tornado, earthquake, blackout, national emergency, or any other type of emergency or critical situation, the Emergency Alert System 136 sends out (typically broadcasts) an emergency alert signal and message. The emergency alert signal and message are received by the EAS information processing system 118, such as from the one or more particular communication channel(s) indicated by the network cloud 120. The EAS alert handler 138 in the EAS information processing system 118 then forwards a corresponding emergency alert message to the wireless communication system controller 112.

The EAS message controller 126 at the wireless communication system controller 112 receives the EAS alert message from the EAS information processing system 118. The access channel selector 130 of the EAS message controller 126 determines the various wireless access methods supported by each coverage area within the wireless communication system 102. In one embodiment, the wireless communication system controller 112 maintains a list 135 of access channels supported by the various coverage areas. For example, a coverage area may provide cellular, PSTN, WiFi, PTT, and other wireless access services (access channels) to its subscribers. The access channel selector 130 selects one or more of the supported wireless access channels for each of the coverage areas. The wireless communication system controller 112 then transmits the emergency alert message to the one or more wireless devices 106, 108, 110 using the selected wireless access channels for the given coverage area. One advantage of transmitting the emergency alert message over multiple wireless access channels is that the probability of reaching the maximum number of people within a given area is maximized.

In an alternative embodiment, the EAS information processing system 118 may receive an emergency alert signal from a local emergency alerting system (not shown) such as (but not limited to) a fire alarm or a burglar alarm. The EAS alert handler 138 in the EAS information processing system 118, in response to receiving the emergency alert signal, then generates its own emergency alert message and sends this emergency alert message to the wireless communication system controller 112 for transmission to the wireless devices 106, 108, 110. It should be noted that the wireless communication system controller 112 can comprise the EAS information processing system 118 for generating the emergency alert messages. Also, the EAS message controller 126 can reside within the EAS information processing system 118.

The emergency alert message can be transmitted to each specific wireless device 106, 108, 110, within a given coverage area. Alternatively, the emergency alert message can be broadcast transmitted to all (non-specific) wireless devices 106, 108, 110, within a given coverage area. For example, a wireless communication system 102 may transmit a broadcast SMS message to all wireless devices in a given coverage area. In another embodiment, the emergency alert message can be both transmitted to one or more specific wireless devices 106, 108, 110, in a first coverage area and also broadcast transmitted to all (non-specific) wireless devices 106, 108, 110, within a second coverage area that may coincide with the first coverage area or is different than the first coverage area.

A wireless device 106 within a given coverage area receives the emergency alert message from the wireless communication system 102 via one or more access channels through the corresponding wireless access interface(s) 146. For example, assume that the current coverage area provides Wi-Fi and cellular access services to its subscribers. Therefore, the EAS message controller 126 of the wireless communication system controller transmits the emergency alert message over both the Wi-Fi and cellular access channels. The wireless device 106 receives the emergency alert message via the cellular channel and/or the Wi-Fi channel depending on factors such as, for example, the operational status of the particular access channel, the ability of the wireless device 106 to receive the message in the location in the coverage area, the current configuration and operation of the wireless device 106, and other factors that affect reception of the message at the wireless device 106.

The emergency alert message manager 145 at the wireless device 106 determines, via the access channel interface monitor 149, the access channel interface(s) 146 over which the emergency alert message was received. The emergency alert message manager 145, via the location module 150, also determines the current location of the wireless device 106. For example, the wireless device 106 can use a GPS receiver module 520 (see FIG. 5) included with to track its own geographic location. Other location determination approaches can be used by the wireless device 106 to determine its geographic location in the environment 100. For example, the wireless device 106 may utilize a gyro based dead reckoning approach, or an accelerometer based approach, Enhanced Observed Time Difference (EOTD), Uplink Time Difference of Arrival (UTDOA), or a combination of the approaches and devices discussed above.

One of the advantages of the various embodiments of the present invention is that the wireless communication system controller 112 and/or the EAS information processing system 118 is notified by a wireless device 106, 108, 110, when the wireless device receives an emergency alert message. This allows the wireless communication system controller 112 and/or the EAS information processing system 118 to identify if an emergency alert message transmitted to a given area was successfully received by the target wireless devices.

Therefore, in one embodiment, the emergency alert message manager 145 at the wireless device 106 generates, via an EAS response generator 152, at least one response message. This response message acts as an acknowledgement back to the wireless communication system controller 112 to indicate that a corresponding emergency alert message was received successfully by the wireless device 106. The EAS response generator 152, in one embodiment, also embeds the location information determined by the location module 150 and/or an identifier(s) associated with the wireless access interface(s) 146 over which the emergency alert message was received.

Figure 2:
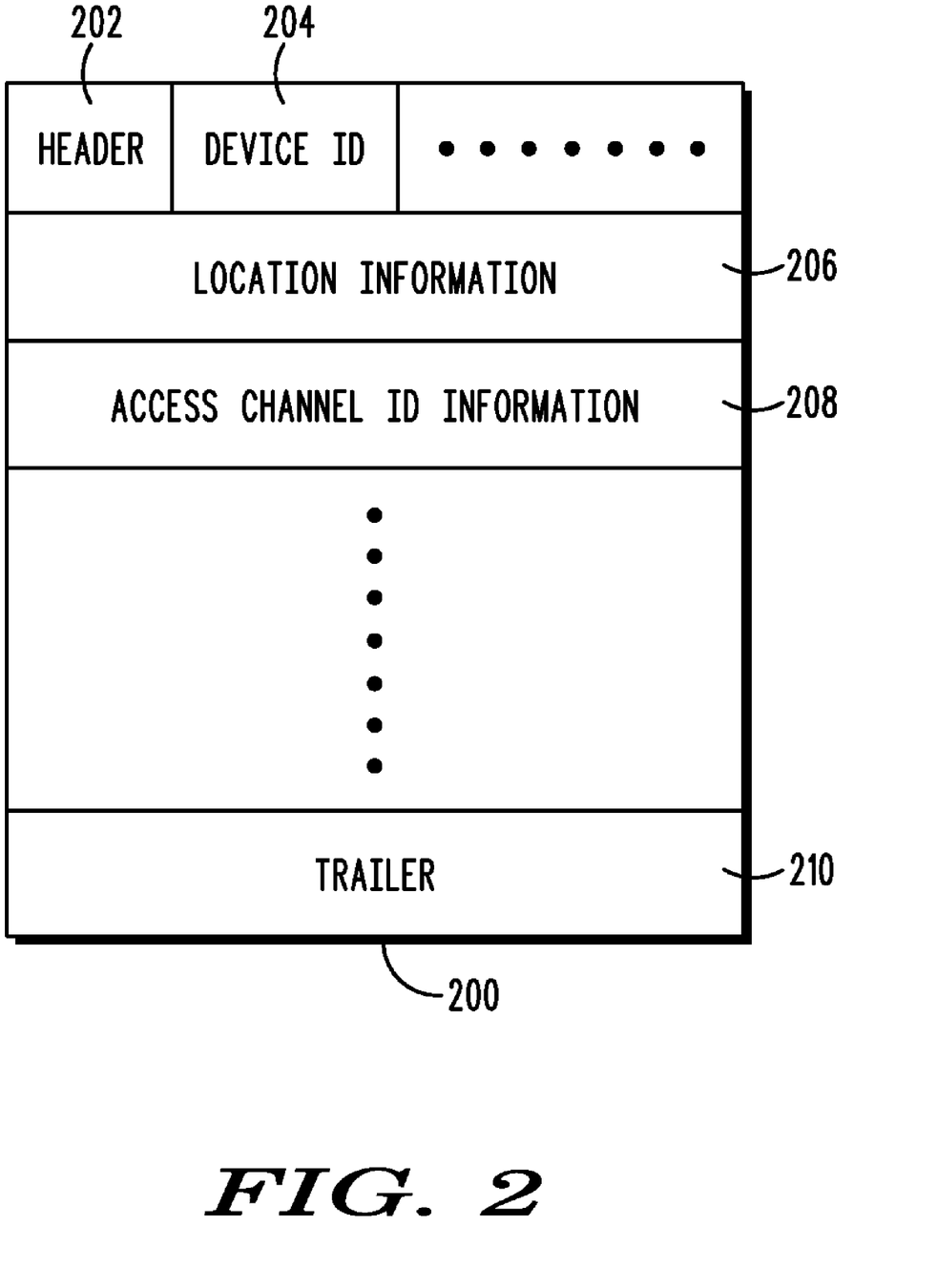
FIG. 2 is a block diagram illustrating an emergency alert message response generated by a wireless device, according to one embodiment of the present invention.

FIG. 2 shows a more detailed view of an example of a response message 200 that is generated by the EAS response generator 152 of the wireless device 106. The general format of the response message 200 utilized by one embodiment of the present invention conforms to a conventional acknowledgement message packet, as is familiar to one of ordinary skill in the relevant arts, with the exception of the additional information discussed below. In order to more clearly describe this aspect of the present invention, only the aspects of the response message 200 to one embodiment of the present invention are shown in FIG. 2.

In particular, FIG. 2 shows a response message 200 comprising a header 202, a device ID 204, location information 206, one or more wireless access channel IDs 208, and a trailer 210. The header 202 signifies the beginning of the response message 200. The device ID 204 identifies the wireless device transmitting the response message 200. The location information 206 corresponds to the current location of the wireless device 106 when the emergency alert message was received. The access channel IDs 208 identify the access channel over which the emergency alert message was received by the wireless device. The trailer signifies the end of the response message 200.

Once the response message 200 is generated, the wireless device 106 transmits the response message 200 to the wireless communication system controller 112 using one or more of the wireless access channels. In one embodiment, the wireless device 106 uses the same wireless access channel on which the device received the emergency alert message to transmit the response message 200 to the wireless communication system controller 112. However, in another embodiment, the wireless device 106 uses any available access channel to transmit the response message 200, including possibly transmitting the response message over at least one access channel that is different from the at least one access channel from which the EAS alert message was received.

FIG. 3 shows a graphical depiction of the process discussed above. For example, FIG. 3 shows that the EAS message controller 126 transmits an emergency alert message 302 to a plurality of wireless devices 304 using multiple wireless access channels 306, 308, 310 that are supported by the given coverage area where the wireless devices are currently residing. The wireless devices 304 in turn receive the emergency alert message 302 and generate an acknowledgement/response message 200. Each of the messages 200 generated by the wireless devices 304 includes the current location of the wireless device and/or the identity of the wireless access channel(s) on which the emergency alert message was received. The messages 200 are then transmitted to the wireless communication system controller 126 using one or more of the access channels 312, 314, 316.

Returning back to FIG. 1, once the wireless communication system controller 112 receives a response message 200 from a wireless device 106, the wireless device response manager 128 of the EAS message controller 126 analyzes the response 200. The device response handler 128 analyzes the response 200 to determine the location of the wireless device and/or the wireless access channel(s) on which the device received the emergency alert message. The EAS message controller 126 is then able to map the geographic locations that are successfully (and/or unsuccessfully) receiving emergency alert messages. The EAS message controller 126 also can determine the status of the access channels associated with the coverage area. In one embodiment, the EAS message controller 126 can determine which access channel has successfully transmitted the EAS alert message to the wireless device within the coverage area. For example, in certain emergencies, the communication infrastructure may be partly damaged (e.g., a cellular base station may be non-operational) and the coordinators of the emergency services would want to know whether alerts have reached all the targeted areas, and through which types of wireless or wired communication systems. Further, it is likely that each wireless access channel is maintained by different connectivity providers, which may be hard to coordinate in terms of understanding the status of all their networks. Therefore, receiving responses back from wireless devices helps to overcome this hurdle.

Figure 4:
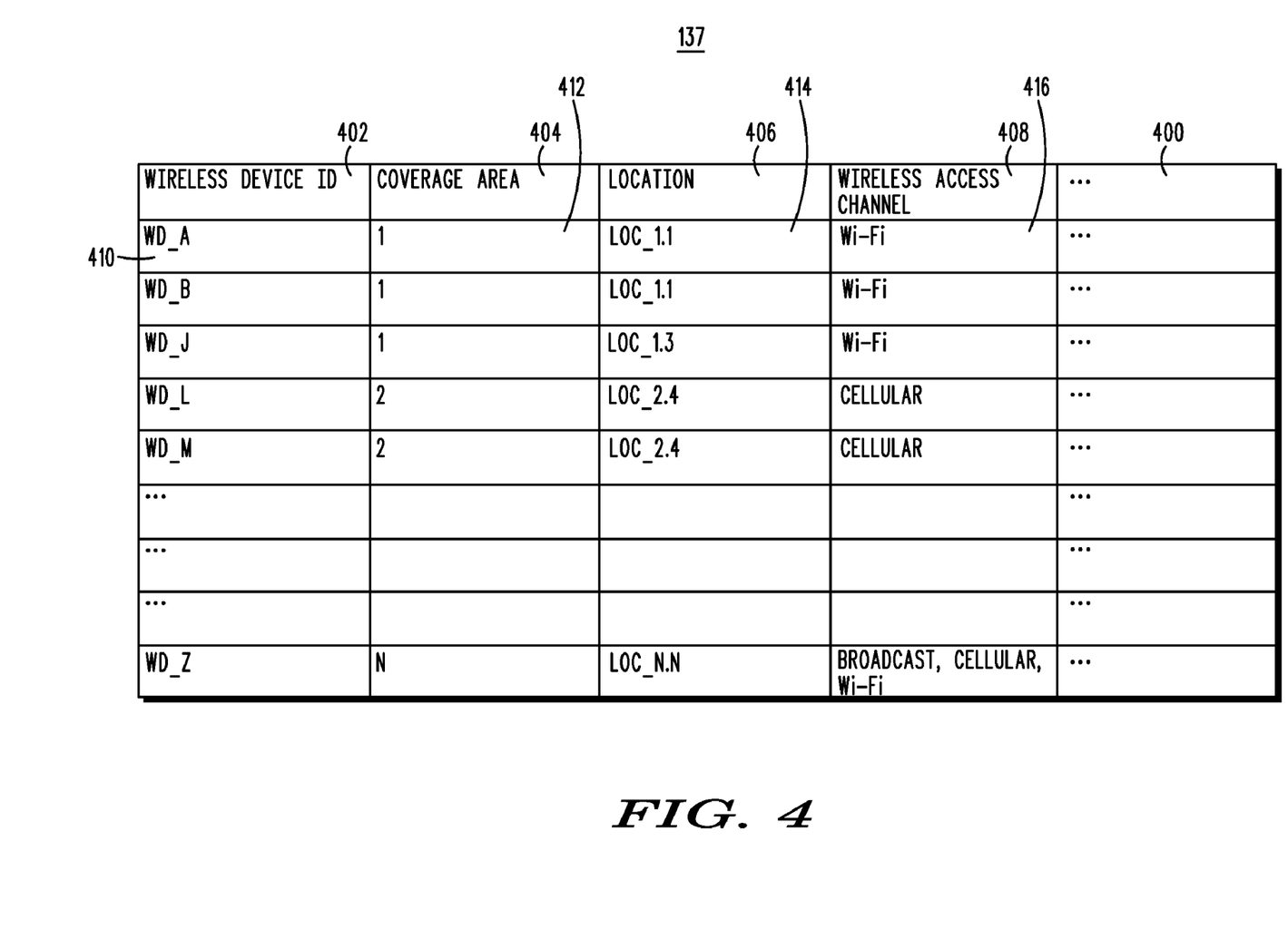
FIG. 4 illustrates one example of the information maintained by an EAS message controller from received emergency alert message responses received from wireless devices according to an embodiment of the present invention.

FIG. 4 shows one example of the data 137 that is maintained by the EAS message controller 126 in response to receiving an acknowledgement/response message 200 from the wireless devices. It should be noted FIG. 4 shows only one example of data that is collected by the EAS message controller 126. Additional information may be added or deleted from the table 400 of FIG. 4. Also, the data collected by the EAS message controller 126 is not required to be stored in table form. The table 400 of FIG. 4, according to the present example, includes a "Wireless Device ID" column 402; a "Coverage Area" column 404; a "Location" column 406; and a "Wireless Access Channel" column 408.

The "Wireless Device ID" column 402 includes entries such as entry 410 that include a wireless device identifier. The "Coverage Area" column 404 includes entries such as entry 412 that identify the coverage area associated with the corresponding wireless device identified under the "Wireless Device ID" column 402. The "Location" column 406 includes entries such as entry 414 that identifies the location of the corresponding wireless device identified under the "Wireless Device ID" column 402 when the device received the emergency alert message. The "Wireless Access Channel" column 408 includes entries such as entry 416 that identify the wireless access channel(s) on which the wireless device received the emergency alert message.

This information allows an automated system and/or an administrator to determine what geographic areas within a coverage area are successfully receiving emergency alert messages and what wireless access channels are properly working. For example, the table 400 of FIG. 4 shows that wireless device WD_A and wireless device WD_B are both located in Coverage Area 1 at location LOC_1.1 and have received an emergency alert message over a Wi-Fi access channel. Either an automated system or an administrator can take this information and compare it to already known information such as the wireless access channels supported by Coverage Area 1.

In the example of FIG. 4, if the only wireless access channel supported by Coverage Area 1 is Wi-Fi, then a determination can be made that the wireless infrastructure at location LOC_1.1 of Coverage Area 1 is operational. However, if Coverage Area 1 supports cellular and Wi-Fi, and the EAS alert message is sent out over all access channels, and all responses from wireless devices indicate that an EAS alert message was received over Wi-Fi, but failed to successfully receive an EAS alert message over cellular, a determination can be made that the cellular infrastructure for a particular location within Coverage Area 1, or for the entire Coverage Area 1, is not operational. Besides being able to determine that a particular access channel failed to deliver the EAS alert message in a coverage area, the system can also determine, in certain embodiments, the one or more locations within the coverage area where one or more wireless devices failed to successfully receive the EAS alert message. This additional information can help to pinpoint the trouble locations and more effectively notify administrative personnel, repair crews, and/or other authorities, as to where to take corrective action to make sure that people in these areas are notified of the emergency situation.

The example of FIG. 4 also shows that responses were received from wireless devices in locations LOC_1.1 and LOC_1.3, but responses from wireless devices in location LOC_1.2 were not received. Therefore, a determination can be made that the wireless/wired infrastructure in location LOC_1.2 is not operational. Additionally, a response message received from a wireless device over a first access channel, where an EAS alert message was sent to the wireless device over first and second access channels, can indicate that the response was to the EAS alert message sent via the first access channel. Consequently, it can be determined by the system that the second access channel has failed to successfully deliver the EAS alert message to the wireless device and therefore the second access channel is likely not operational. As can be seen, various embodiments of the present invention can determine system outages during an emergency situation and can verify emergency alert message transmissions to wireless devices. If an outage is identified, such as at Coverage Area 1 location LOC_1.2, an automated system can notify an administrator and/or a repair crew and/or the appropriate authorities to ensure that individuals in that particular location are notified of the emergency situation. Notifications can be provided to users, via one or more user interfaces, and/or to other information processing systems via automated communication and messaging protocols.

It should also be noted that the information in the table 400 of FIG. 4 can be displayed (via one or more user interfaces) as one form of notification, such as using visual indicators on a map, or a representation of a map, so that administrators of the wireless communication system, coordinators of the emergency alerting system, and/or repair crews, and/or other users of information processing systems, can pinpoint the troubled geographic locations. A map or representation of a map can identify successful transmissions of EAS messages to wireless devices and/or the failure to successfully transmit the EAS message to wireless devices. Also, a map or representation of a map is not limited to a graphical representation of a map; any combination of one or more of the following could be used: tables with numbers, text descriptions, graphs, graphical maps, and one or more pictures comprising a map.

Wireless Device

Figure 5:
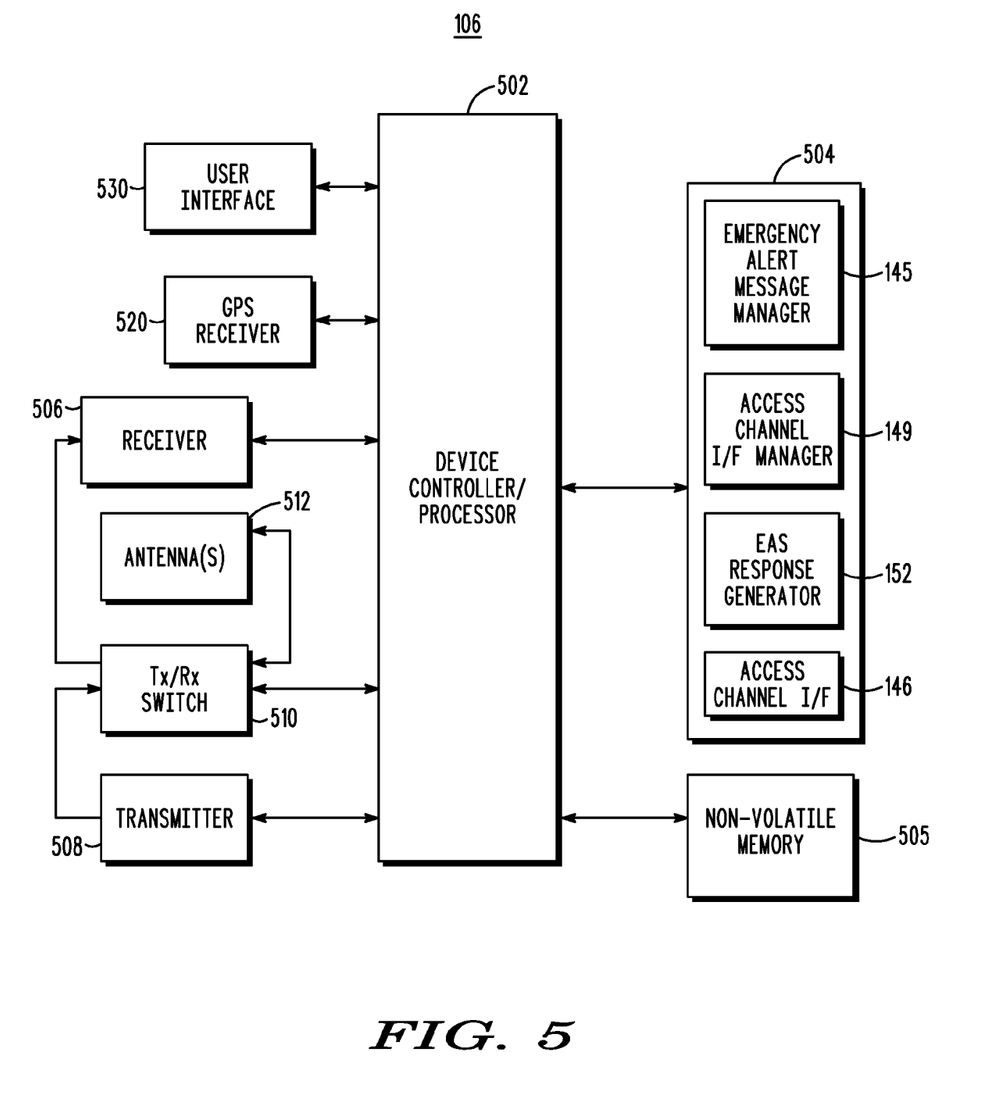
FIG. 5 is a block diagram illustrating a more detailed view of a wireless device as implemented in the example of FIG. 1, according to one embodiment of the present invention.

FIG. 5 is a block diagram illustrating a more detailed view of the wireless device 106, 108, 110, according to one embodiment of the present invention. It is assumed that the reader is familiar with wireless communication devices. To simplify the present description, only that portion of a wireless communication device that is relevant to the present invention is discussed. The wireless device 106, 108, 110, operates under the control of a device controller/processor 502, that controls the sending and receiving of wireless communication signals. In receive mode, the device controller 502 electrically couples at least one antenna 512 through a transmit/receive switch 510 to a receiver 506. The receiver 506 decodes the received signals and provides those decoded signals to the device controller 502.

In transmit mode, the device controller 502 electrically couples the at least one antenna 512, through the transmit/receive switch 510, to a transmitter 508. The wireless device 120, 122, can also include an additional transceiver as discussed above. For example, a multi-mode wireless device 120,122, can communicate over multiple channels and accordingly would utilize multiple transceivers. However, the receiver 506 and transmitter 508 pair can also provide the functionality of the transceiver discussed above. The wireless device 502 also includes volatile memory 504 and non-volatile storage memory 505. Either of these memories 504, 505, can include the software components implementing the emergency alert message manager 145, access channel interfaces 146, access channel interface monitor 149, and EAS response generator 152. These components have been discussed above in greater detail. Lastly, as shown in FIG. 5, a GPS receiver module 520 is used by the controller 502 to determine a current location of the wireless device 120, 122, in the universal coordinate system. As has been discussed above, other location determination technologies (e.g., gyro based dead reckoning, accelerometer based determination, etc.) can be used in combination with, or as a substitute for, the GPS receiver 520.

Information Processing System

Figure 6:
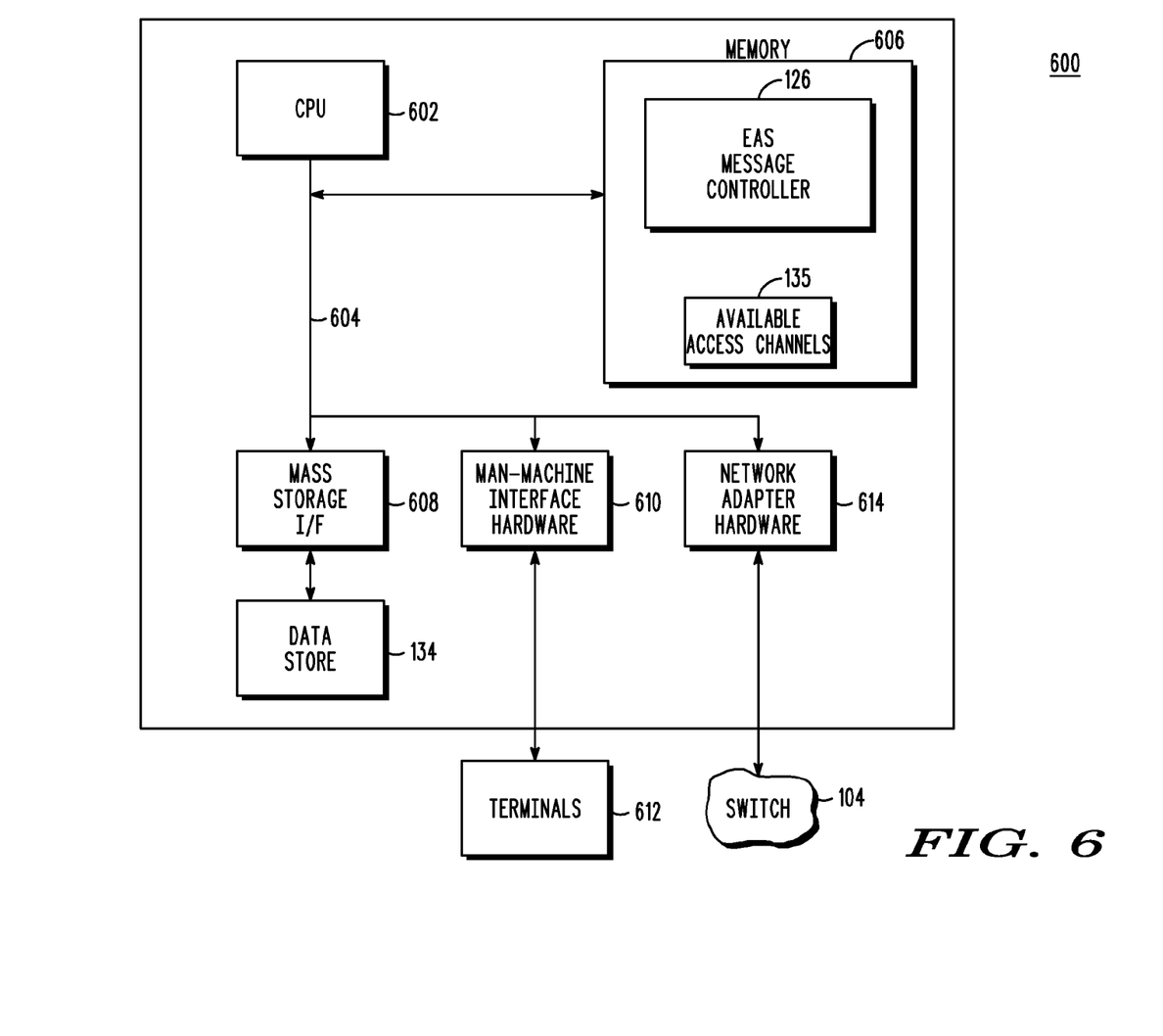
FIG. 6 is a block diagram illustrating a detailed view of an information processing system as implemented in the example of FIG. 1, according to one embodiment of the present invention.

FIG. 6 is a block diagram illustrating a detailed view of an information processing system 600 such as the wireless communication system controller 112 already discussed above. The information processing system 600 includes a computer. As an alternative, the information processing system 600 could be a software function running on a non-dedicated application CPU that already exists in the network. The computer has one or more processors 602 that are connected to a main memory 606, a mass storage interface 608, man/machine interface hardware 610, and network adapter hardware 614. A system bus 604 interconnects these system components. The mass storage interface 608 is used to connect mass storage devices, such as the auxiliary information database 138 to the information processing system 600. The man/machine interface hardware 610 can be communicatively coupled with terminals 612 for users of the information processing system 108 to administrate and manage the information processing system 600. The network adapter hardware 614, in this example, is communicatively coupled with network 104.

The main memory 606, in one embodiment, includes the EAS message controller 126, the data store 134, and the available access channels information 135, which have been discussed above in greater detail. Various embodiments of the present invention can be adapted to work with any data communications connections including present day analog and/or digital techniques or via a future networking mechanism.

Figure 7:
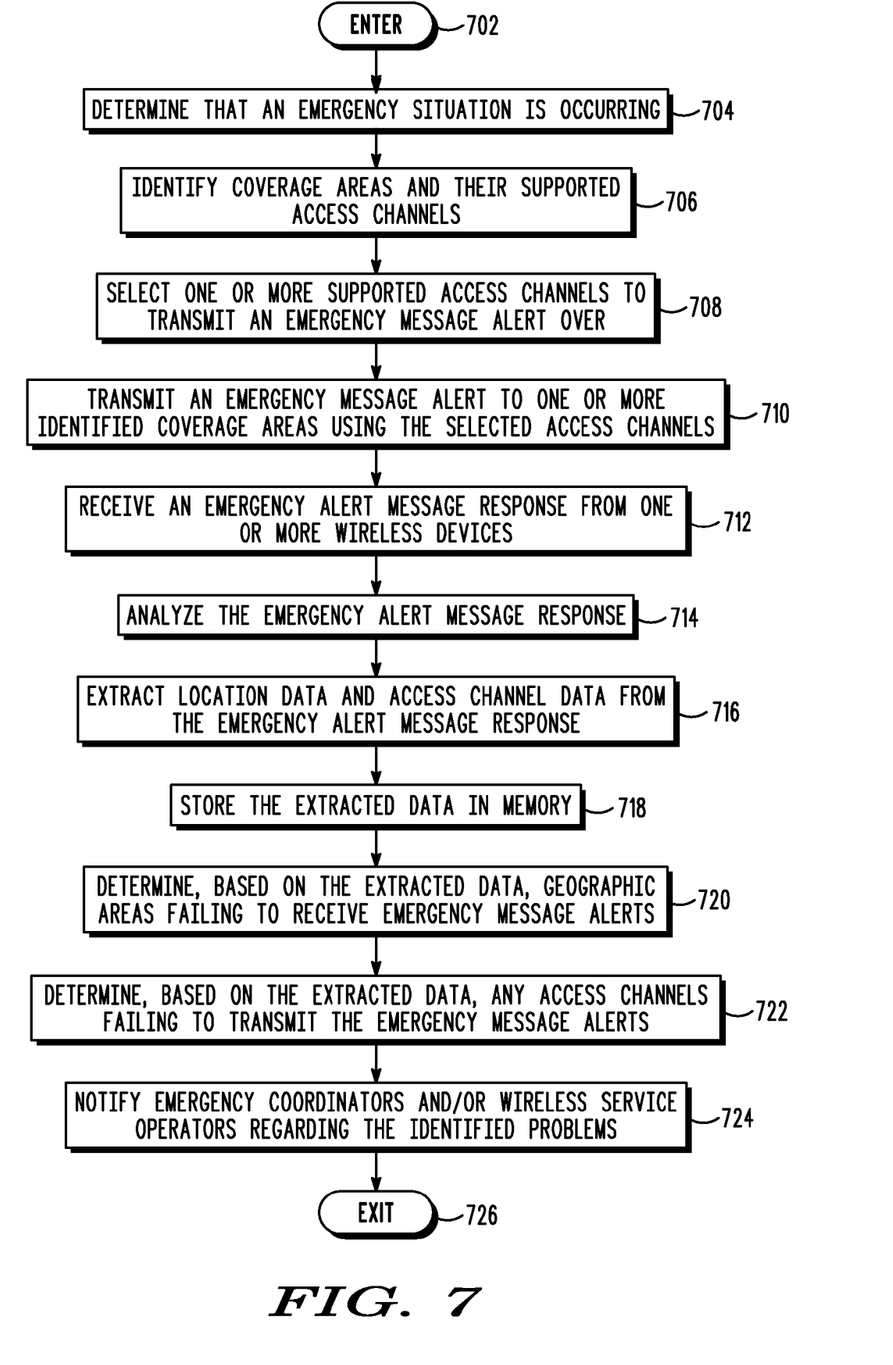
FIG. 7 is an operational flow diagram illustrating a process of managing emergency alert message transmissions to wireless devices, according to one embodiment of the present invention.

Process of Managing the Transmission of Emergency Message Alerts to Wireless Devices FIG. 7 is an operational flow diagram illustrating a process of transmitting emergency alert messages to various coverage areas and monitoring the receptions of those messages. The operational flow diagram of FIG. 7 begins at step 702, and then flows directly to step 704. The EAS message controller 126, at step 704, determines that an emergency situation is occurring. For example, the EAS message controller 126 can receive an emergency alert message from the EAS information processing system 118. If the EAS information processing system 118 is part of the wireless communication system controller 112, the emergency alert message can be received directly from the EAS system 136. The EAS message controller 126, at step 706, identifies the coverage areas affected by the emergency situation. The EAS message controller 126 also identifies the supported access channels for each of the identified coverage areas.

The EAS message controller 126, at step 708, selects one or more of the identified access channels for each of the identified coverage areas. The EAS message controller 126, at step 710, transmits an emergency alert message to the identified coverage areas using the selected access channels for each coverage area. In one embodiment, the emergency alert message is broadcasted over the selected access channels so that the EAS message controller 126 is not required to know which wireless devices 106 are within a coverage area. In another embodiment, the emergency alert message is specifically addressed to each wireless device in a coverage area.

The EAS message controller 126, at step 712, receives an emergency alert message response back from one or more wireless devices. The EAS message controller 126, at step 714, analyzes the response. The EAS message controller 126, at step 716, extracts location information and access channel ID information from the response. The EAS message controller 126, at step 718, stores the extracted information in the data store 134. The EAS message controller 126, at step 720, determines, based on the extracted information, geographic areas failing to transmit the emergency alert message to its subscribers. For example, the EAS message controller 126 can determine based on the responses received from wireless devices that wireless devices at a particular location or cell-site or coverage area have not responded. This indicates to the EAS message controller 126 that the equipment such as a base station covering that location is most likely down.

The EAS message controller 126, at step 722, determines, based on the extracted information, any access channels that are failing to properly transmit the emergency alert message. For example, if the EAS message controller 126 transmitted the emergency alert message over three different access channels in a given coverage area and responses are only indicating two of those channels are working, the EAS message controller 126 determines that the other channel is likely non-operational in that area. These determinations also allow for the EAS message controller 126 to generate maps with the problem areas highlighted. The EAS message controller 126, at step 724, notifies emergency coordinators, administrators, authorities, and/or wireless service providers of the identified problems. The notifications could be provided to users, such as via one or more user interfaces, and/or could be provided to other information processing systems (not shown) via automated communication and messaging protocols. The control flow then exits at step 726.

Process of Responding to an Emergency Alert Message

Figure 8:
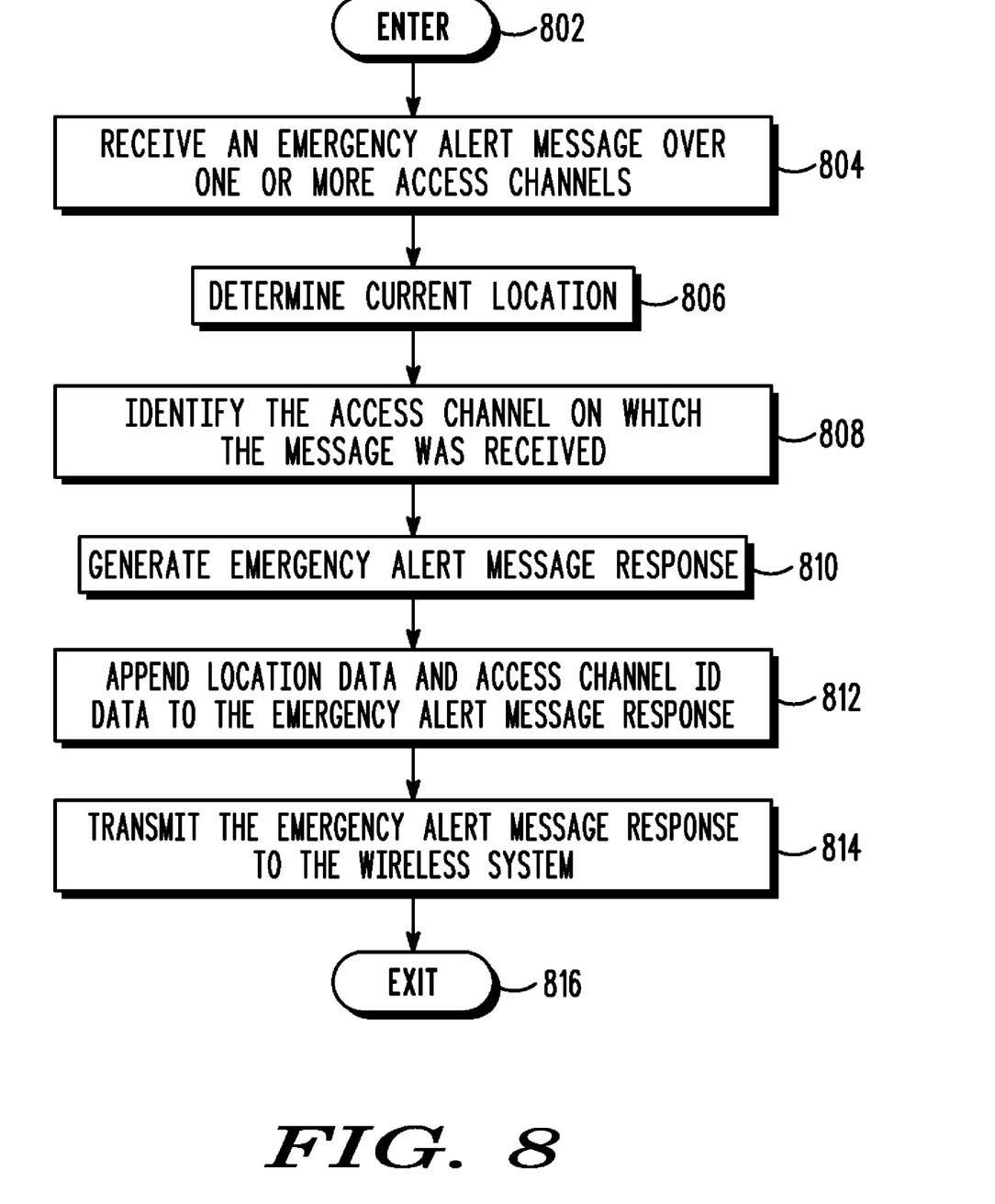
FIG. 8 is an operational flow diagram illustrating a process of a wireless device generating and transmitting a response to a received emergency alert message, according to one embodiment of the present invention.

FIG. 8 is an operational flow diagram illustrating a process of responding to an emergency alert message. The operational flow diagram of FIG. 8 begins at step 802, and then flows directly to step 804. The wireless device 106, at step 804, receives an emergency alert message over one or more access channels. The emergency alert message manager 145 at the wireless device 106, at step 806, determines the current location of the wireless device 106. The emergency alert message manager 145, at step 808, identifies the access channel(s) over which the emergency alert message was received. The emergency alert message manager 145, at step 810, generates an emergency alert message response. The emergency alert message manager 145, at step 812, appends location information and access channel identifier information to the response. The emergency alert message manager 145, at step 814, transmits the emergency alert message response to the wireless system 102. According to various embodiments of the present inventions, the EAS message manager 145 can cause the response message to be transmitted over one or more access channels available to the wireless device 106. By transmitting the response over multiple access channels it increases the reliability of the system receiving the response and can provide additional access channel operation status to the system controller 112. The control flow then exits at step 816.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method with a wireless communication system for transmitting emergency alert system messages to wireless devices, the method comprising:
   receiving an emergency alert system alert message for delivery to one or more wireless devices in a coverage area of a wireless communication system;
   transmitting the emergency alert system alert message to the one or more wireless devices using one or more access channels associated with the coverage area;
   receiving an acknowledgement message from at least one of the one or more wireless devices comprising an identifier associated with each access channel in the one or more access channels over which the wireless device received the emergency alert system alert message; and
   storing, based on receiving the acknowledgement message,
      a set of information indicating which access channel in the one or more access channels has successfully transmitted the emergency alert system alert message to the at least one wireless device within the coverage area;
         determining at least one access channel in the one or more access channels that has failed to successfully deliver the emergency alert system alert message;
         generating a representation of a map of the coverage area; and
         displaying visual indicators in the representation of a map indicating the at least one access channel in the one or more access channels that has failed to successfully deliver the emergency alert system alert message.

2. The method of claim 1, wherein the one or more access channels include at least one of:
   a packet data channel; and
   a circuit services channel.

3. The method of claim 1, wherein the emergency alert system alert message is at least one of
   specifically addressed to the one or more wireless devices; and
   broadcasted to the coverage area and being destined for reception by all wireless devices within the coverage area.

4. The method of claim 1, further comprising:
   determining, in response to storing, at least one access channel in the one or more access channels that has failed to successfully deliver the emergency alert system alert message to the one or more wireless devices.

5. The method of claim 1, further comprising:
   notifying, in response to the determining, that at least one access channel in the one or more access channels has failed to successfully deliver the emergency alert system alert message.

6. An information processing system, for transmitting emergency alert system alert messages to wireless devices, comprising:
   a memory;
   a processor communicatively coupled to the memory; and
   an emergency message controller, communicatively coupled to the memory and the processor, wherein the emergency message controller is adapted to:
      receive an emergency alert system alert message for delivery to one or more wireless devices in a coverage area of a wireless communication system;
      transmit the emergency alert system alert message to the one or more wireless devices using one or more access channels associated with the coverage area;
      receive an acknowledgement message from at least one of the one or more wireless devices comprising an identifier associated with each access channel in the one or more access channels over which the wireless device received the emergency alert system alert message; and
      store, based on the acknowledgement message being received,
         a set of information indicating which access channel in the one or more of access channels has successfully transmitted the emergency alert system alert message to the at least one of the one or more wireless devices within the coverage area;
   wherein the emergency message controller is further adapted to:
      determine at least one access channel in the one or more access channels that has failed to successfully deliver the emergency alert system alert message;
      generate a representation of a map of the coverage area and
      display visual indicators in the representation of a map indicating the at least one access channel in the one or more access channels that has failed to successfully deliver the emergency alert system alert message.

7. The information processing system of claim 6, wherein the one or more access channels include at least one of:

a packet data channel; and a circuit services channel.

8. The information processing system of claim 6, wherein the emergency message controller is further adapted to:

determine, in response to the set of information being stored, at least one access channel in the one or more access channels that has failed to successfully deliver the emergency alert system alert message to the one or more wireless devices.

9. The information processing system of claim 8, wherein the emergency message controller is further adapted to:

notify, in response to at least one location being determined within the coverage area where wireless devices have failed to successfully receive the emergency alert system alert message, that at least one access channel in the one or more access channels has failed to successfully deliver the emergency alert system alert message.

10. The information processing system of claim 6, wherein the emergency alert system alert message is at least one of specifically addressed to the one or more wireless devices; and broadcasted to the coverage area being destined for reception by all wireless devices within the coverage area.

* * * * *

UNITED STATES PATENT AND TRADEMARK OFFICE
CERTIFICATE OF CORRECTION

| | | |
|---|---|---|
| PATENT NO. | : 8,200,183 B2 | Page 1 of 1 |
| APPLICATION NO. | : 12/042563 | |
| DATED | : June 12, 2012 | |
| INVENTOR(S) | : Aftelak et al. | |

It is certified that error appears in the above-identified patent and that said Letters Patent is hereby corrected as shown below:

In Column 14, Line 61, in Claim 6, delete "area" and insert -- area; --, therefor.

Signed and Sealed this
Twenty-ninth Day of January, 2013

David J. Kappos
*Director of the United States Patent and Trademark Office*